United States Patent
Losey

(10) Patent No.: US 6,885,285 B2
(45) Date of Patent: Apr. 26, 2005

(54) ADVANCED REMOTE OPERATION SYSTEM

(75) Inventor: Allan Losey, Ortonville, MI (US)

(73) Assignee: Siemens VDO Automotive Corporation, Auburn Hills, MI (US)

( * ) Notice: Subject to any disclaimer, the term of this patent is extended or adjusted under 35 U.S.C. 154(b) by 359 days.

(21) Appl. No.: 09/916,456

(22) Filed: Jul. 27, 2001

(65) Prior Publication Data

US 2002/0109583 A1 Aug. 15, 2002

Related U.S. Application Data

(60) Provisional application No. 60/269,087, filed on Feb. 15, 2001.

(51) Int. Cl.[7] ............................................... G05B 19/00
(52) U.S. Cl. .............. 340/5.72; 340/426.1; 340/825.69; 340/825.72; 307/10.1; 307/10.2
(58) Field of Search ............................. 340/5.72, 426.1, 340/825.69, 825.72, 5.32, 5.33, 539.1, 5.61, 5.64, 539.11, 426.13, 426.15, 426.16, 426.19, 426.2, 426.21; 307/10.1, 10.2; 701/49, 36; 374/132; 165/202

(56) References Cited

U.S. PATENT DOCUMENTS

| | | | | | |
|---|---|---|---|---|---|
| 5,791,407 | A | * | 8/1998 | Hammons | ................... 165/202 |
| 6,140,938 | A | * | 10/2000 | Flick | ..................... 340/825.69 |
| 6,243,022 | B1 | * | 6/2001 | Furukawa | ............. 340/825.72 |
| 6,263,272 | B1 | * | 7/2001 | Liu et al. | ...................... 701/49 |

* cited by examiner

*Primary Examiner*—Ario Etienne
*Assistant Examiner*—Yves Dalencourt

(57) ABSTRACT

A remote vehicle operation system has a control unit in communication with at least one subsystem of a vehicle. In one embodiment, a transmitter communicates with the control unit and transmits feedback signals to a portable receiver carried by the operator. One such subsystem may be a climate control subsystem. A communication unit communicates with the climate control subsystem and transmits a feedback signal when the subsystem meets a predetermined condition. The communication unit may have a transmitter in communication with the control unit. This embodiment may thus be a climate control subsystem in a vehicle and a control unit in communication with the subsystem.

10 Claims, 2 Drawing Sheets

ADVANCED REMOTE OPERATION SYSTEM

This application claims priority to Provisional Patent Application Ser. No. 60/269,087 filed Feb. 15, 2001.

BACKGROUND OF THE INVENTION

The invention relates to a method and system for selective remote control of at least two vehicle systems.

Control systems currently exist that permit vehicle operators to remotely operate certain aspects of a vehicle's subsystems. For example, remote keyless entry systems permit an operator to open and lock the vehicle's doors and windows. A radio transmitter generally located in a key fob sends a key code to a receiver in the vehicle. A control unit in communication with the receiver then determines if the key code matches a security code and unlocks or locks the vehicle's ports if there is a match between key code and security code.

More recently, systems allow for the remote ignition of a vehicle's engine. Remote ignition systems typically comprises a key fob with a radio transmitter and a receiver tied to the vehicle's ignition system. Upon activation, the transmitter sends a radio signal carrying a key code to a control unit within the vehicle. The control unit determines whether the key code matches the vehicle's ignition code and starts the vehicle when there is a match.

While remote control systems do exist for the operation of a vehicle' security system and ignition system, such systems are relatively simple. The known systems permit the transmission of commands from an operator to the vehicle but fail to provide feedback to the vehicle operator concerning the execution of these commands. For example, a remote keyless entry system provides no information to the operator as to whether the vehicle is locked or unlocked. Consequently, a vehicle operator may actually have to inspect visually the condition of the locks or test the handles of the vehicle door to determine whether the vehicle is in a locked or unlocked condition.

Also, a remote start system provides no direct feedback as to whether the vehicle has actually started. Moreover, many vehicle operators use the remote start feature of such systems to start the vehicle's air conditioning and heating subsystem to permit the vehicle to warm up or cool down the vehicle prior to the operator's entry into the vehicle. Because the remote ignition systems currently available provide no remote feedback, the operator must guess when the vehicle interior temperature is ready for entry, resulting in wasted time and fuel.

A need therefore exists for a remote operation system that provides the vehicle operator with feedback concerning the operations of the vehicle.

SUMMARY OF THE INVENTION

One embodiment of the invention relates to a remote vehicle operation system, comprising a control unit in communication with at least one subsystem of a vehicle and a first transmitter on the vehicle in communication with the control unit. A first receiver communicates with the transmitter and outputs information about the subsystem to a general user interface. The general user interface may be a display to provide the operator with feedback of the subsystem's operation. The first receiver may be portable and may be a phone such as a telephone or a cell phone. In this way, the remote vehicle operation system may provide a vehicle operator with a wide variety of vehicle subsystem data without the inconvenience of checking these systems by entering the vehicle.

The remote vehicle operation system may provide the vehicle operator with information concerning the vehicle's security system, including the status of the vehicle's locks and alarm system, as well as the whether any door or port is opened or closed. The system may also provide information concerning the vehicle ignition system such as whether the system has been activated. Such information may also include the status of the air conditioning and heating system as well as interior temperature. Through the vehicle's navigation system, the vehicle may even provide data concerning the location of the vehicle.

A second receiver in the vehicle may communicate with a second transmitter and the control unit, thereby permitting bidirectional communication between vehicle and operator. In this way, the invention permits remote control over the vehicle's subsystems and immediate feedback of the operation of these subsystems. In contrast to current systems, the invention permits detailed review and control over such subsystems.

Another embodiment of the invention concerns a remote vehicle operation system comprising an environment conditioning subsystem in a vehicle and a communication unit in communication with the environmental conditioning subsystem. The communication unit transmits a signal when the environmental conditioning subsystem meets a predetermined condition. The signal may be the sounding of the car horn or the illumination of a vehicle light, such as an interior light or headlight. If it flashes, the user must continuously be watchful to see if it is left on. It can be checked periodically, however, if the light is illuminated. The communication unit may also be more sophisticated, involving a transmitter and a portable receiver, such as a telephone or cell phone that may ring when the predetermined condition is met.

A sensor may sense the predetermined condition and communicate this condition to the control unit. The predetermined condition may relate to temperature, such as the air temperature of the interior of the vehicle. The predetermined condition may also relate to the passing of time.

The invention may include a control unit in communication with the communication unit. The control unit may control a motorized door or window. The control unit may control movement of the motorized port based on satisfaction of the predetermined condition. For example, windows may open or close to permit the environment conditioning subsystem to meet its predetermined condition.

The remote vehicle operation system may also comprise an environment conditioning subsystem in a vehicle. A control unit communicates with the environment conditioning subsystem and a transmitter. A portable receiver in communication with the transmitter permits a general user interface to display the information, such as vehicle interior air temperature relating to the subsystem.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
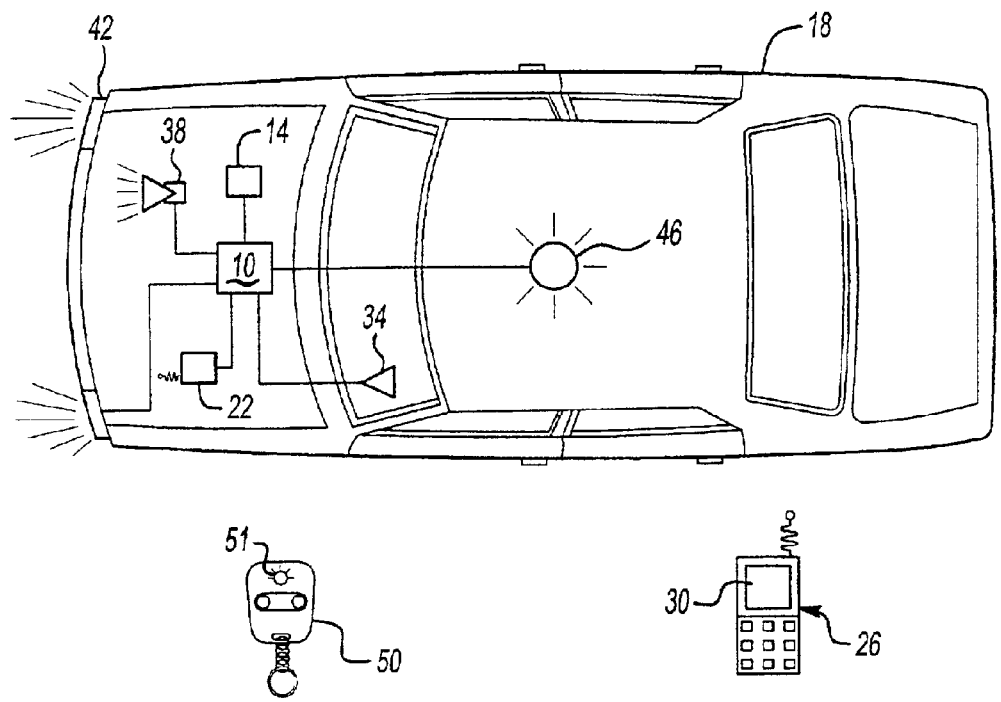
FIG. 1 illustrates a plan view of an embodiment of the invention, including a subsystem, control unit, first receiver, and first transceiver.

FIG. 1 illustrates an embodiment of the invention. The remote vehicle operation system comprises control unit 10 in communication with at least one subsystem 14 of vehicle 18. Subsystem 14 may include an environment conditioning system such as an air conditioning and heating system, a navigation system, a vehicle security system, a vehicle ignition system, or a motorized window or port system. Such subsystems are well known in the industry. Control unit 10, such as a computer or other processor, obtains information from subsystem 14.

Control unit 10 communicates this information to first transmitter 22, which sends this information in the form of a signal to first receiver 26. First transmitter 22 may be an onboard cellular phone system already available on many vehicles. Such cellular systems already have in place security features to prevent unauthorized use, and as known, these security features and others may be employed to restrict access to the information. First receiver 26, such as a portable cell phone or stationary telephone, has a general user interface, such as display 30, to provide a vehicle operator with the information about subsystem 14. First transmitter 22 may also have a second receiver (shown as part of first transmitter) to permit for the reception of information to control unit 10. Second transmitter (shown as part of first receiver 26) may send information such as instructions to control unit 10. In this way, communication between vehicle and operator is bi-directional: information may be sent from vehicle 18 to an operator and the operator may send information to vehicle 18.

Accordingly, unlike rudimentary systems currently available, the invention permits for remote review of information regarding subsystem 14 as well as their remote control. For example, control unit 10 may obtain and send valuable information about the temperature setting of the air conditioning and heating system, blower settings, and other data used to control and operate the system. An operator may use this information to control directly the settings of the environment conditioning system. Through a navigation system, control unit 10 may also track the location of vehicle 18 and obtain other geographical information. An operator may use this subsystem to inquire about the closest location of hotels and restaurants in the area. Control unit 10 may also provide data about the status of the vehicle security system, such as whether doors are locked or unlocked or the alarm system is armed. If doors are unlocked, the operator may instruct control unit 10 through second transmitter 26 and second receiver 22 to lock or remotely unlock the doors. In conjunction with a motorized window or port system, control unit 10 may determine whether the windows or trunk are open or closed. Control unit 10 may ascertain whether vehicle ignition is activated and the duration of activation.

Control unit 10 may also actively control vehicle 18 the operation of the subsystems in conjunction with each other. For example, if the environmental conditioning system detects an interior temperature through sensor 34 higher than desired by a vehicle operator, control unit 10 may open the windows to lower temperature. Additionally, control unit 10 may raise the windows prior to cooling the interior of vehicle 18 by the environment conditioning system.

Another feature of the invention comprises a remote vehicle operation system including an environment conditioning subsystem in vehicle 18 and communication unit in communication with the environmental conditioning subsystem. This feature maybe used separately or in combination with the above feature. Communication unit transmits a signal when the environmental conditioning subsystem meets a predetermined condition. That is, the operator may desire a particular temperature in the vehicle. Once the vehicle is started, and the heating or cooling system has started, the control unit monitors an internal temperature and when the actual cab temperature reaches the desired temperature, then the signal is sent. This allows the operator to know it is now comfortable within the vehicle. This method is shown in the FIG. 3 flowchart.

Communication unit may be car horn 38, which simply chirps when the predetermined condition is met. Alternatively, communication unit may be a car headlight 42 or interior light 46 that flashes or illuminates or otherwise activates. And as described above, the communication unit may be transmitter 22 and receiver 26. Receiver 26 may be a portable cell phone or stationary telephone with or without a general user interface such as a display. Receiver 26 could be a simple key fob 50, and light 51 goes on when the temperature is as desired. Accordingly, for example, transmitter 22 may call receiver 26, such as through vehicle's cellular phone system, thereby alerting the operator that interior of vehicle has been heated to a set temperature.

Sensor 34 may communicate with transmitter 22 and receiver 26 through control unit 10 and provide information about the predetermined condition to control unit 10 to make a determination as to whether the condition exists. The predetermined condition may relate to temperature within vehicle 18 and may also relate to time. Control unit 10 may communicate with at least one motorized port, such as a window, and control the movement of the window based on the predetermined condition. For example, in the event the interior temperature of vehicle 18 is higher than the temperature set by the operator, the predetermined condition, then control unit 10 may automatically lower the windows of vehicle 18. That is, if the difference between the cab temperature and desired temperature is relatively great, the window may be opened to assist in more rapid cool down.

Figure 3:
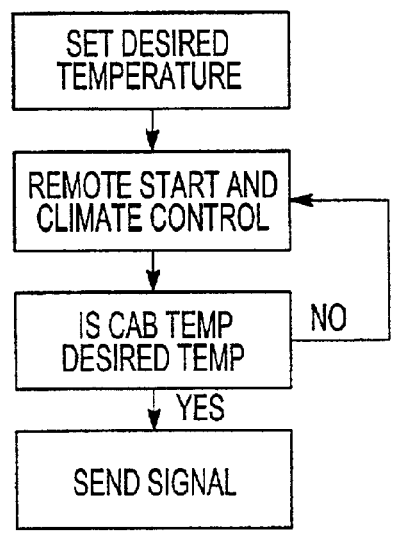
FIG. 3 shows a flow chart of an embodiment of the invention.

With such an embodiment, an operator may set a specific air temperature to be the predetermined condition. Thus, following the remote start of the vehicle ignition, control unit 10 through sensor 34 tracks the ambient air temperature within the passenger compartment of vehicle 18. When control unit 10 determines that the passenger compartment has reached (or is within a few degrees) the air temperature set by the operator, control unit 10 sounds horn 38, activates a vehicle light, such as headlight 42 or interior light 46, or sends a call through transmitter 22 to receiver 26 (or 50) to the operator to alert the operator that the vehicle has reached the desired temperature. Alternatively, control unit 10 may simply track the time that has expired since the ignition of the vehicle and then send a signal to the operator when a set time has expired. Under either teaching, control unit 10 apprises operator when vehicle is ready, thereby avoid unnecessary waiting of the warming or cooling of vehicle 18. This method is shown in FIG. 3.

Figure 2:
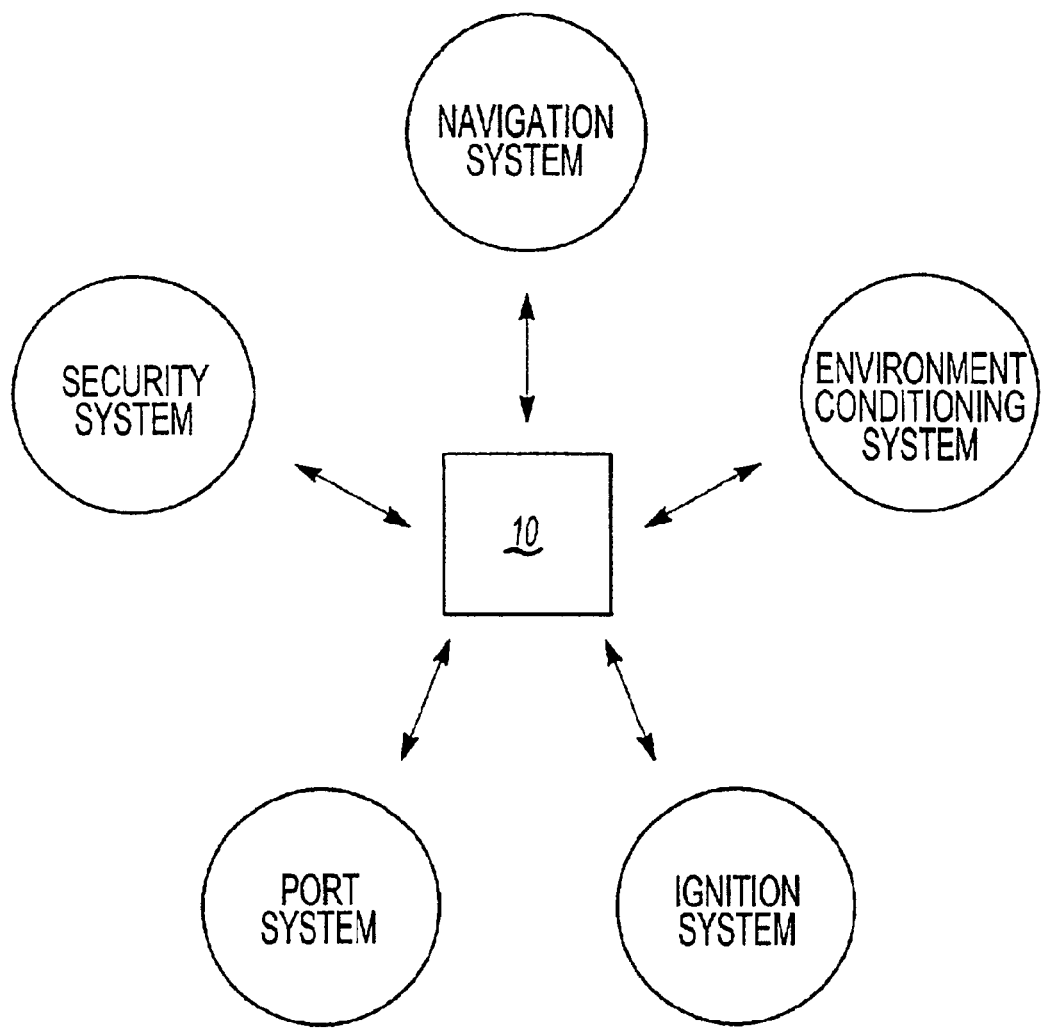
FIG. 2 is a schematic.

FIG. 2 shows a schematic of the various subsystems 14 that may be remotely controlled by control unit 10. There are other subsystems that may be likewise controlled. One of ordinary skill in the art could integrate such subsystems for remote control based on the above disclosure.

The aforementioned description is exemplary rather then limiting. Many modifications and variations of the present invention are possible in light of the above teachings. The preferred embodiments of this invention have been disclosed. However, one of ordinary skill in the art would recognize that certain modifications would come within the scope of this invention. Hence, within the scope of the appended claims, the invention may be practiced otherwise than as specifically described. For this reason the following claims should be studied to determine the true scope and content of this invention.

What is claimed is:

1. A remote vehicle operation system comprising:
    a control unit in communication with a vehicle climate control system and at least one other subsystem of a vehicle;
    a vehicle transmitter/receiver for communication with said control unit; and
    a remote transmitter/receiver for communication with said vehicle transmitter/receiver, said remote transmitter/receiver for sending a signal to said vehicle transmitter/receiver to control said vehicle climate control system and said at least one other subsystem, said control unit for sending a feedback signal about said vehicle climate control system and said at least one other subsystem.

2. The remote vehicle operation system of claim 1 wherein said remote transmitter/receiver is a phone.

3. The remote vehicle operation system of claim 1 wherein said at least one other subsystem is a vehicle navigation system.

4. The remote vehicle operation system of claim 1 wherein said at least one other subsystem is a vehicle security system.

5. The remote vehicle operation system of claim 1 wherein said at least one other system is a vehicle ignition system.

6. The remote vehicle operation system of claim 1 wherein said control unit is for comparing a cab temperature to a desired temperature and for sending said feedback signal to let an operator know that the cab temperature is within a range of said desired temperature.

7. The remote vehicle operation system of claim 3 wherein said feedback signal relates to a vehicle location.

8. The remote vehicle operation system of claim 3 wherein said feedback signal relates to information from said vehicle navigation system.

9. The remote vehicle operation system of claim 5 wherein said feedback signal relates to said vehicle ignition system.

10. A method of remote control of a vehicle operation system comprising the steps of:
    (1) transmitting a command to a vehicle subsystem from an operator control;
    (2) receiving the command at the vehicle;
    (3) directing the vehicle subsystem based on the command;
    (4) assessing data relating to the vehicle subsystem; and
    (5) transmitting feedback based on the data to the operator wherein said command is a remote ignition signal, and step (3) includes starting the vehicle and a vehicle climate control, and step (4) includes the step of comparing a desired cab temperature to an actual cab temperature, and sending said feedback when the two are within a range.

* * * * *